२,७९८,२४४

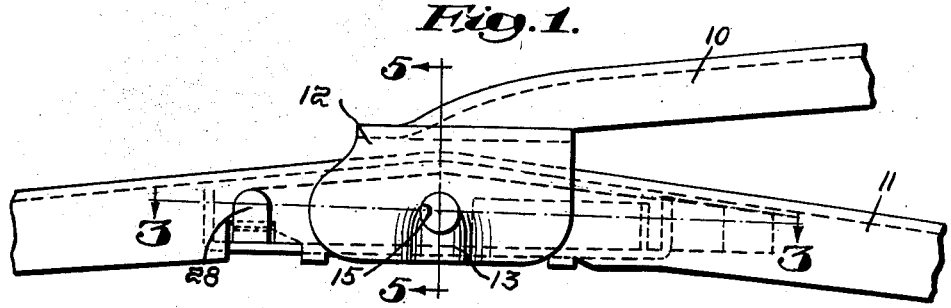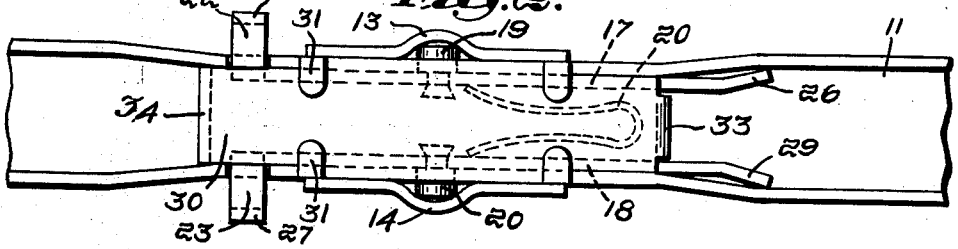

ARM AND BLADE CONNECTOR FOR WINDSHIELD WIPERS

Israel Nesson, Lynn, Mass., assignor to Max Zaiger, Swampscott, Mass.

Application August 20, 1954, Serial No. 451,269

6 Claims. (Cl. 15—250)

This invention relates to a connector for providing a disengageable pivot connection between two moving members, for example, for connecting windshield wiper blades to a wiper arm.

The general purpose of connectors of this type is to provide for rotational movement of the blade with respect to the arm about an axis transverse to the arm while securing the blade against displacement as the arm reciprocates back and forth. Such a connection should preferably be made so that the blade can be manually disengaged from the wiper arm without the use of tools. The connection must be light and compact so that it does not present too much obstruction to vision through the windshield, and yet secure enough to withstand vibration and road shock, as well as the usual reciprocating motion of the arm. The general object of this invention is to provide a connector especially suitable for this purpose which is secure but can yet be readily and quickly released, which gives a true, well aligned pivot connection, which can be easily incorporated in, or added to, blades and arms of existing types, which is compact and inconspicuous, and which is made up of a minimum number of inexpensive sheet metal parts.

In the drawings illustrating the invention:

Fig. 1 is a side view of the connector as applied to a typical wiper arm and blade;

Fig. 2 is a bottom view of the connector;

Fig. 3 is a cross-section taken along line 3—3 of Fig. 1;

Fig. 4 is a cross-section similar to Fig. 3 showing the connector in a position to be released from the arm;

Fig. 5 is a cross-section taken along line 5—5 of Fig. 1, somewhat enlarged; and Fig. 6 is a perspective detail of one of the movable arms of the connector.

As shown in the drawings, the wiper arm 10 terminates in a saddle member 12 which straddles the wiper blade 11. The latter is of generally conventional channel shape and preferably has a reduced portion 11a in the region of the connector. The saddle member has bowed portions 13 and 14 extending upward from the lower edges of its legs. Mounted in the blade are a pair of movable arms 17 and 18 which carry pins 19 and 20, respectively. These pins engage in holes 15 and 16 in the saddle member, the holes being directly aligned with the bowed portions 13 and 14. Between the movable arms 17 and 18 is mounted a leaf spring 21 which urges the arms apart. The arms have bent-out ends 26 and 29 which bear against the inner sides of the wiper blade and provide a fulcrum about which the arms rotate when moved. On the other ends of the arms projecting lugs 22 and 23 pass through slots 24 and 25, respectively, in the sides of the wiper blade channel. These lugs carry upturned tabs 27 and 28 which provide a finger grip. The arm and spring assembly is held in place in the blade channel by a bottom plate 30 having upturned ends 33 and 34, the plate being secured by tabs 31 bent over from the walls of the channel.

When the tabs 27 and 28 are pressed together, as shown in Fig. 4, the arms are moved inward carrying pins 19 and 20 out of engagement with holes 15 and 16, respectively, in the saddle member. The wiper blade may then be disengaged from wiper arm 10 by sliding it out of the saddle member. The blade may be connected to the saddle member simply by pushing it in, as the spring will give and allow pins 19 and 20 to slide up inside the bowed portions 13 and 14 until they snap into holes 15 and 16. The bowed portions are flared outward at the bottom to permit entry of the pins, and curve inward toward the holes, so that the spring becomes compressed as the pins ride up inside the saddle and is released when the pins reach the holes. It will be noted that when the blade is connected it is freely rotatable on the pins which serve as pivots.

Instead of being mounted inside the wiper blade channel, the spring and arm assembly may be mounted in a suitable casing attached to the back of the blade. The saddle member 12, likewise, may be made integral with the arm 10 or may be a separate member attached to the arm.

What is claimed is:

1. A windshield wiping device of the type having a windshield wiper blade member, a wiper arm member and a connector therefor, said connector comprising: a pair of legs attached to one of the members to be connected; a pair of arms mounted on the other member to be connected and movable toward and away from each other; a pair of outwardly projecting pins mounted on said arms; a pair of holes in said legs adapted to receive said pins, said legs being adapted to straddle a portion of said arms; a spring normally urging said arms apart and holding said pins into engagement with said holes; and extensions on said arms, accessible at a point outside said legs, for pushing the arms together to disengage the pins.

2. A windshield wiper device as described in claim 1, said extensions comprising lugs having flat ends forming finger grips for moving the arms together against the force of said spring.

3. A windshield wiper device as described in claim 1, said legs having bowed portions aligned with said holes, said portions having inwardly sloping surfaces for guiding the pins into the holes when the legs are slid over the arms to engage the connector.

4. A windshield wiping device of the type having a windshield wiper blade member, a wiper arm member and a connector therefor, said connector comprising: a casing on one of the members to be connected, having generally parallel side walls; a saddle member attached to the other member to be connected, and adapted to straddle a portion of said casing and having legs adapted to lie alongside said side walls, when the members are connected; a pair of arms mounted in said casing, each arm carrying an outwardly projecting pin and an outwardly projecting tab, the side walls of the casing having openings through which the pins and tabs pass freely; holes in said legs for receiving said pins; and a spring normally urging said arms apart, thereby holding said pins in engagement with said holes when the members are connected the tabs projecting out of said casing at a point outside said legs when the pins are thus engaged.

5. A windshield wiper device as described in claim 4, having a U-shaped leaf spring disposed between and engaging the arms to urge the same apart.

6. A windshield wiper device as described in claim 4, the arms having ends bearing against the side walls and the spring being disposed between the arms, between said ends and the tabs, the ends serving as fulcrums about which the arms may move toward and away from each other.

References Cited in the file of this patent

UNITED STATES PATENTS

| | | |
|---|---|---|
| 1,073,991 | Jones | Sept. 23, 1913 |
| 2,605,491 | Williams | Aug. 5, 1952 |

FOREIGN PATENTS

| | | |
|---|---|---|
| 18,475 | Great Britain | Oct. 30, 1902 |
| 655,259 | Great Britain | July 18, 1951 |
| 685,290 | Great Britain | Dec. 31, 1952 |